US010708562B2

(12) United States Patent
Moriya

(10) Patent No.: US 10,708,562 B2
(45) Date of Patent: Jul. 7, 2020

(54) IMAGE SIGNAL PROCESSING APPARATUS, IMAGE PROCESSING CIRCUIT, AND IMAGE PROCESSING METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Akira Moriya, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 120 days.

(21) Appl. No.: 16/123,640

(22) Filed: Sep. 6, 2018

(65) Prior Publication Data
US 2019/0289268 A1    Sep. 19, 2019

(30) Foreign Application Priority Data

Mar. 19, 2018 (JP) ................. 2018-051390

(51) Int. Cl.
*H04N 9/73* (2006.01)
*H04N 1/60* (2006.01)
(Continued)

(52) U.S. Cl.
CPC .......... *H04N 9/735* (2013.01); *H04N 1/6027* (2013.01); *H04N 5/2351* (2013.01);
(Continued)

(58) Field of Classification Search
CPC .... H04N 9/735; H04N 5/2354; H04N 1/6027; H04N 5/2352; H04N 5/2351; H04N 5/243; H04N 9/73
See application file for complete search history.

(56) References Cited

U.S. PATENT DOCUMENTS 7,889,245 B2 *  2/2011  Lukac .................... H04N 9/735
                                                      348/223.1
8,013,907 B2 *  9/2011  Kuang .................... H04N 9/735
                                                      348/223.1
(Continued)

FOREIGN PATENT DOCUMENTS

JP    4635828 B2    12/2010
JP    4757927 B2    8/2011
(Continued)

OTHER PUBLICATIONS

Extended European Search Report in corresponding European Patent Application No. 18193145.2, dated Mar. 14, 2019.

*Primary Examiner* — Jason A Flohre
(74) *Attorney, Agent, or Firm* — White & Case LLP

(57) ABSTRACT

An image processing circuit includes a gain calculation circuit and a digital amplifier. The gain calculation circuit calculates a first gain with which an average color-difference value in a whole region of a pickup image is brought close to a predetermined convergent point. The digital amplifier performs correction of a white balance of a pixel of the pickup image with a candidate pixel that is of a first candidate pixel calculated based on the first gain and a second candidate pixel calculated based on a second gain associated with each of divided regions and in which a color-difference component is closer to the predetermined convergent point.

11 Claims, 8 Drawing Sheets

(51) Int. Cl.
*H04N 5/235* (2006.01)
*H04N 5/243* (2006.01)

(52) U.S. Cl.
CPC ......... *H04N 5/2352* (2013.01); *H04N 5/2354* (2013.01); *H04N 5/243* (2013.01); *H04N 9/73* (2013.01)

(56) References Cited

U.S. PATENT DOCUMENTS

| | | |
|---|---|---|
| 8,830,348 B2 | 9/2014 | Nomura |
| 2006/0203311 A1 | 9/2006 | Weng et al. |
| 2008/0170160 A1 | 7/2008 | Lukac |
| 2010/0208099 A1* | 8/2010 | Nomura ............ G06K 9/00255 |
| | | 348/223.1 |
| 2015/0244915 A1 | 8/2015 | Kikuchi |
| 2016/0269707 A1* | 9/2016 | Yoshizaki ............... H04N 9/735 |
| 2017/0094241 A1 | 3/2017 | Fujiwara et al. |
| 2017/0171523 A1* | 6/2017 | Radakovic ............ G06K 9/4661 |

FOREIGN PATENT DOCUMENTS

| | | |
|---|---|---|
| JP | 5187241 B2 | 4/2013 |
| WO | 2006072671 A1 | 7/2006 |

* cited by examiner

IMAGE SIGNAL PROCESSING APPARATUS, IMAGE PROCESSING CIRCUIT, AND IMAGE PROCESSING METHOD

CROSS-REFERENCE TO RELATED APPLICATION

This application is based upon and claims the benefit of priority from the Japanese Patent Application No. 2018-51390, filed on Mar. 19, 2018; the entire contents of which are incorporated herein by reference.

FIELD

An embodiment described herein relates generally to an image signal processing apparatus, an image processing circuit, and an image processing method.

BACKGROUND

Conventionally, there is an auto white balance technology of adjusting a white balance of a pickup image obtained by picking up an object. Color of the object of the pickup image changes depending on light of a light source that illuminates the object. In the auto white balance technology, based on a pixel value of the whole of the pickup image, gains for respective color components are calculated, and the color of the pickup image is adjusted.

In the auto white balance technology, when the object is under a plurality of light sources, the white balance is adjusted based on light of a dominant light source in the whole of the pickup image, and the white balance in a region receiving light of another light source is lost, in some cases.

DETAILED DESCRIPTION

An image processing circuit in an embodiment includes a gain calculation circuit and a digital amplifier. The gain calculation circuit calculates a first gain with which an average color-difference value in the whole region of a pickup image is brought close to a predetermined convergent point. The digital amplifier performs correction of a white balance of a pixel of the pickup image with a candidate pixel that is of a first candidate pixel calculated based on the first gain and a second candidate pixel calculated based on a second gain associated with each of a plurality of divided regions into which the pickup image is divided and in which a color-difference component is closer to the predetermined convergent point, and sets the first gain as the second gain in the divided regions in each of which a corrected pixel number to which the correction with the second candidate pixel is performed is smaller than a predetermined threshold value.

Embodiment

An embodiment will be hereinafter, described with reference to the drawings.

Figure 1:
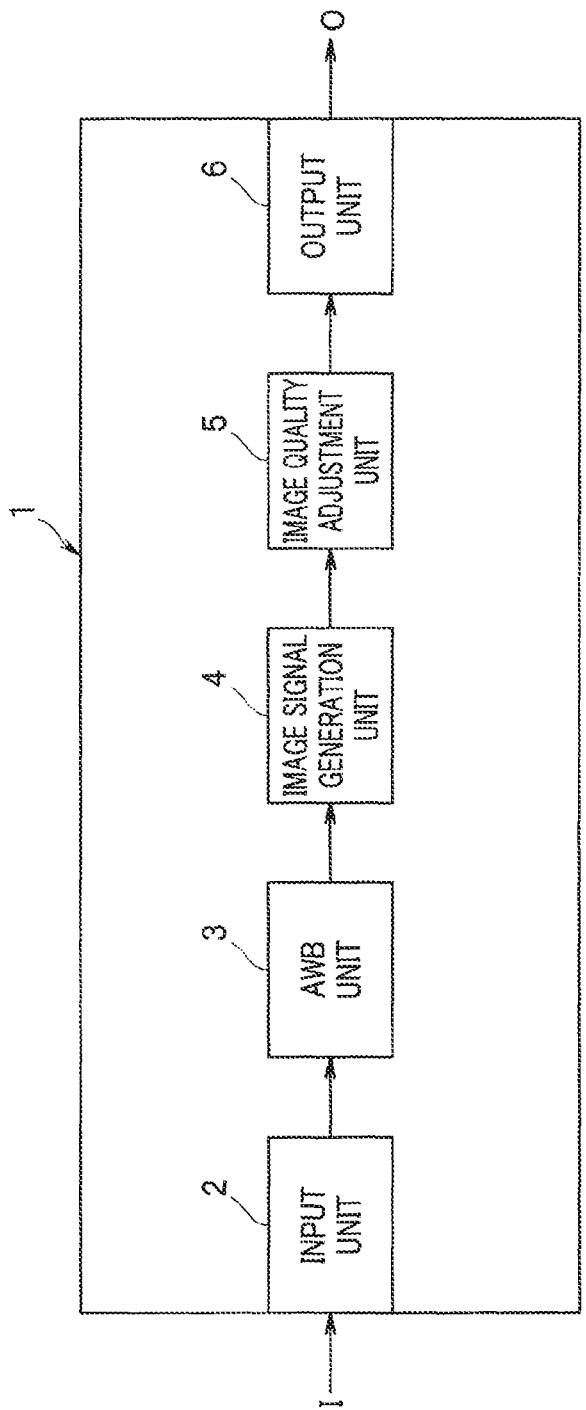
FIG. 1 is a block diagram showing an example of a configuration of an image signal processing apparatus according to an embodiment.

FIG. 1 is a block diagram showing an example of a configuration of an image signal processing apparatus 1 according to an embodiment.

The image signal processing apparatus 1 includes an input circuit 2, an AWB circuit 3 that is an image processing circuit, an image signal generation circuit 4, an image quality adjustment circuit 5, and an output circuit 6.

The input circuit 2 is an interface circuit. The input circuit 2 is connected with an external circuit such as a pickup element, and a pickup image I is sequentially input from the external circuit. The input circuit 2 buffers the pickup image I, and outputs the pickup image I to the AWB circuit 3.

The AWB circuit 3 is a circuit configured to adjust the white balance. The AWB circuit 3 adjusts the white balance of the pickup image I input from the input circuit 2, and outputs the pickup image I to the image signal generation circuit 4.

The image signal generation circuit 4 is a circuit configured to perform a color interpolation process from an RAW format to an RGB format and a color matrix process. The image signal generation circuit 4 performs the color interpolation process and the color matrix process to the pickup image I input from the AWB circuit 3, and outputs the pickup image I to the image quality adjustment circuit 5.

The image quality adjustment circuit 5 is a circuit configured to adjust a luminance and a contrast. The image quality adjustment circuit 5 adjusts the luminance and the contrast of the pickup image I input from the image signal generation circuit 4, and outputs the pickup image I to the output circuit 6.

The output circuit 6 is an output terminal, for example. The output circuit 6 is connected with an external circuit, and outputs an output image O in which the luminance and the contrast are adjusted before the input from the image quality adjustment circuit 5, to the external circuit.

Subsequently, the AWB circuit 3 will be described.

Figure 2:
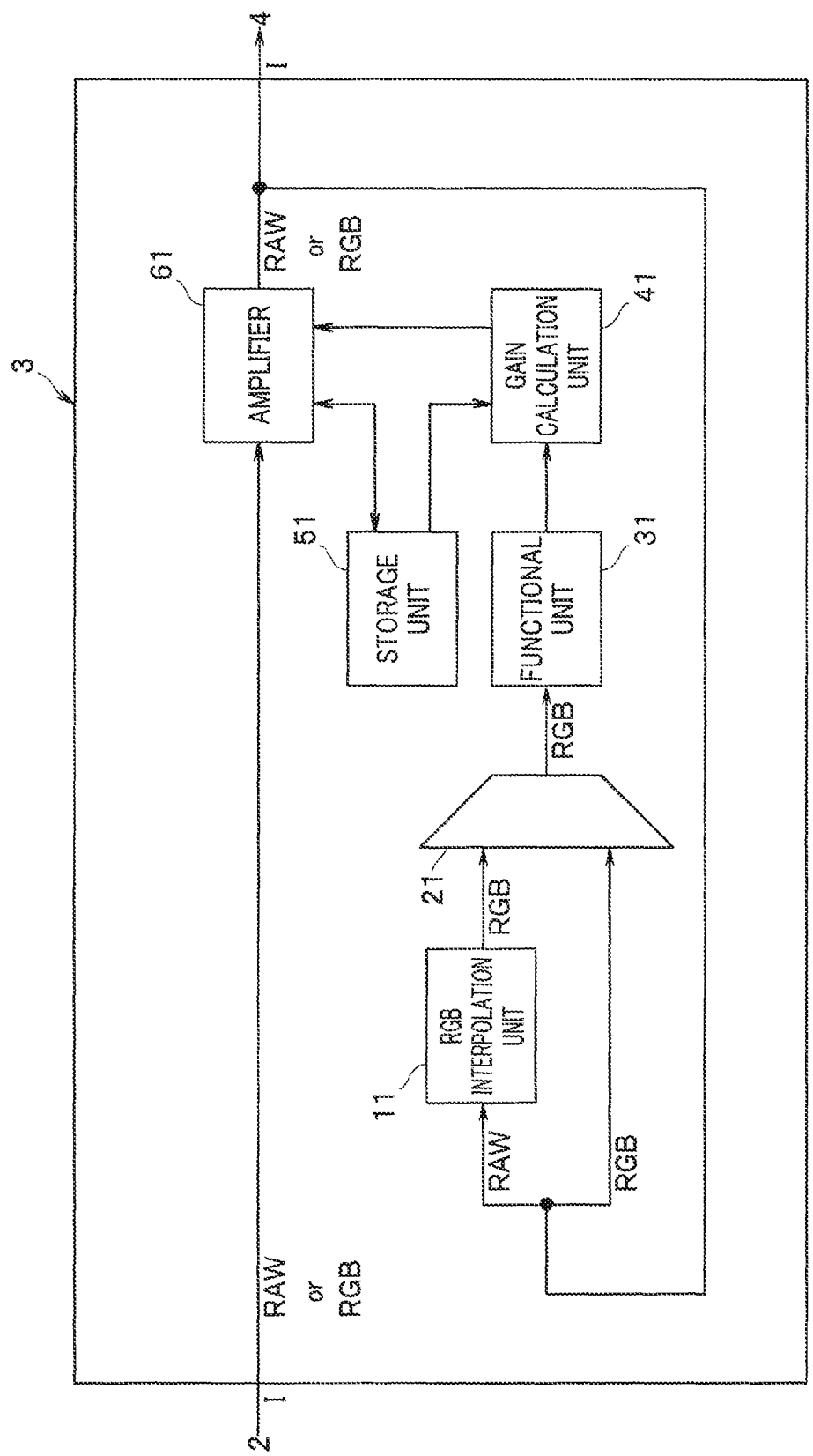
FIG. 2 is a block diagram showing an example of a configuration of an AWB circuit of the image signal processing apparatus according to the embodiment.
Figure 3:
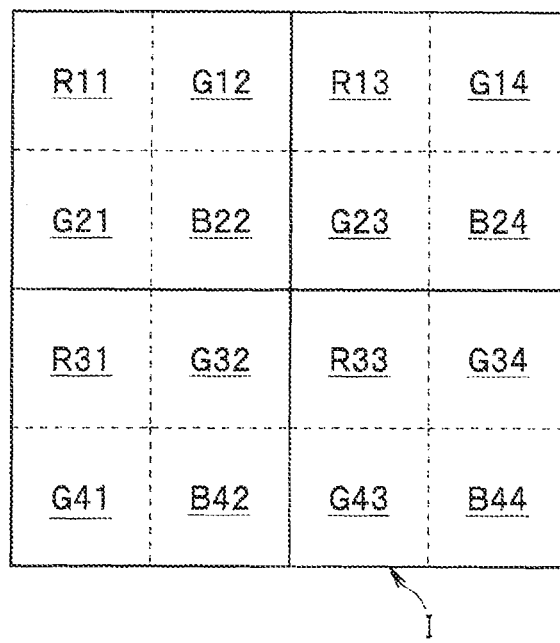
FIG. 3 is a diagram for describing an example of a color interpolation process in an RGB interpolation circuit of the AWB circuit of the image signal processing apparatus according to the embodiment.
Figure 4:
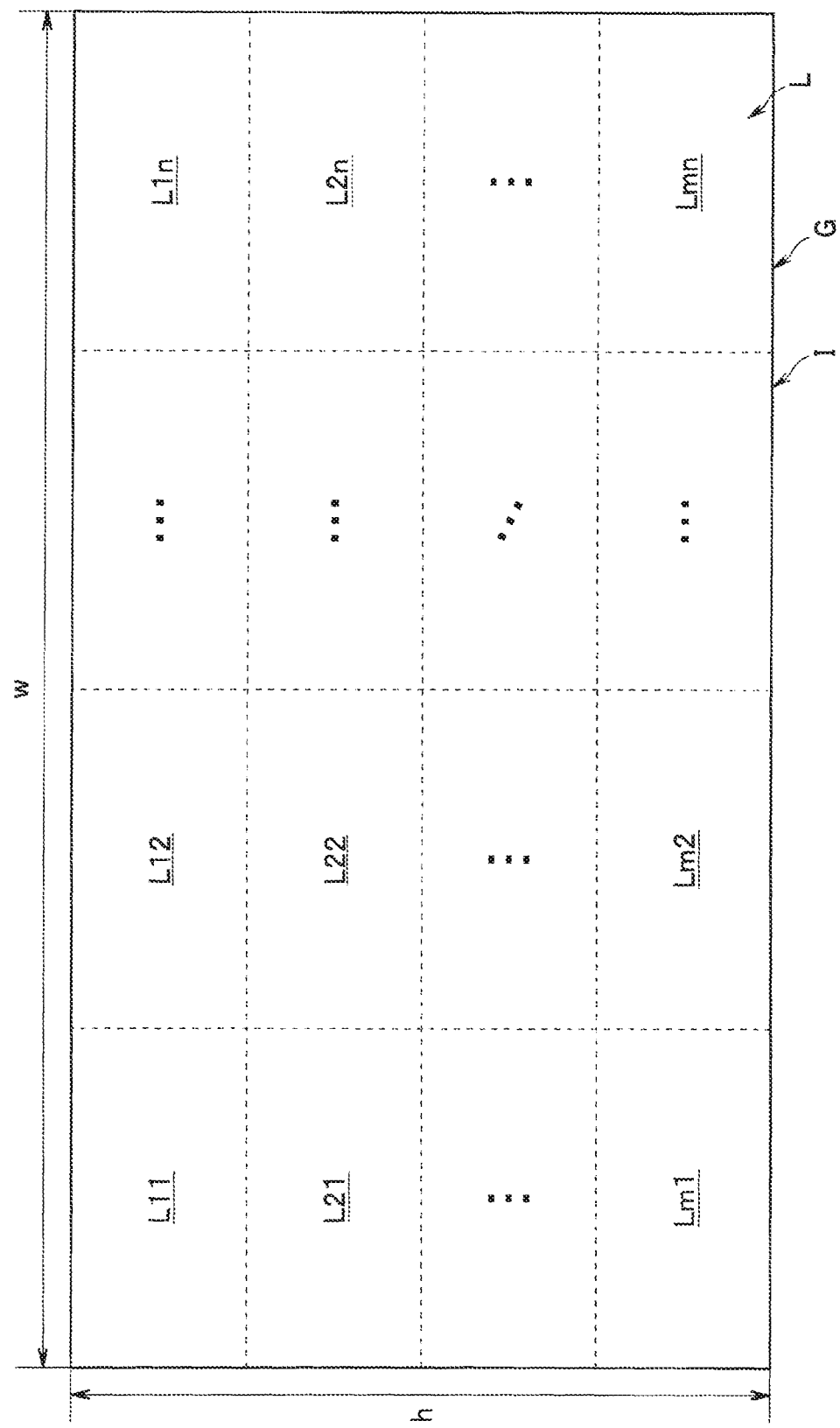
FIG. 4 is a diagram for describing an example of divided regions of a pickup image of the image signal processing apparatus according to the embodiment.
Figure 5:
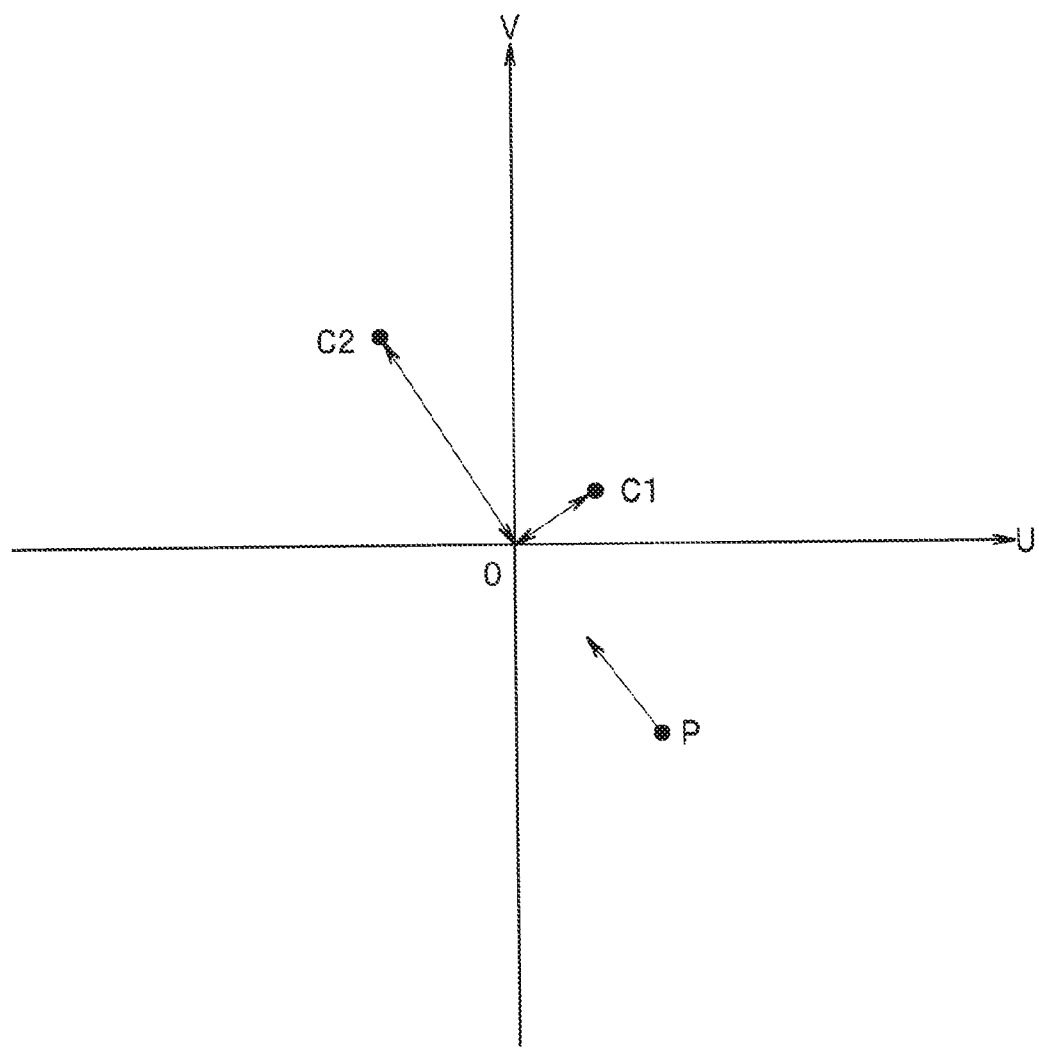
FIG. 5 is an explanatory diagram for describing a calculation process for a first gain, a second gain and a correction gain in the AWB circuit of the image signal processing apparatus according to the embodiment.

FIG. 2 is a block diagram showing an example of a configuration of the AWB circuit 3 of the image signal processing apparatus 1 according to the embodiment. FIG. 3 is a diagram for describing an example of a color interpolation process in an RGB interpolation circuit 11 of the AWB circuit 3 of the image signal processing apparatus 1 according to the embodiment. FIG. 4 is a diagram for describing an example of divided regions L of the pickup image I of the image signal processing apparatus 1 according to the embodiment. FIG. 5 is an explanatory diagram for describing a calculation process for a first gain, a second gain and a correction gain in the AWB circuit 3 of the image signal processing apparatus 1 according to the embodiment.

As shown in FIG. 2, the AWB circuit 3 includes the RGB interpolation circuit 11, a selection circuit 21, a functional circuit 31, a gain calculation circuit 41, a storage circuit 51, and a digital amplifier 61.

The pickup image I in either the RAW format or the RGB format may be input to the AWB circuit 3. The AWB circuit 3 can output the pickup image I in either the RAW format or the RGB format. The format of the input or output of the pickup image I is previously determined.

When the pickup image I is input from the input circuit 2, the digital amplifier 61 corrects the pickup image I by an operation based on a gain, and outputs the pickup image I to the image signal generation circuit 4. The corrected pickup image I is fed back to the gain calculation circuit 41 through the functional circuit 31. Based on the corrected pickup image I, the gain calculation circuit 41 calculates the gain that is used for a next correction of the pickup image I, and outputs the gain to the digital amplifier 61. With repetition of the feedback, the adjustment of the white balance of the pickup image I advances.

The RGB interpolation circuit 11 is a circuit configured to perform the color interpolation process from the RAW format to the RGB format. The RGB interpolation circuit 11 is connected with the digital amplifier 61, and the pickup image I output by the digital amplifier 61 is fed back and is input. When the pickup image I in the RAW format is fed back, the RGB interpolation circuit 11 performs the color interpolation process, and outputs the pickup image I in the RGB format to the selection circuit 21.

As described in FIG. 3, in the pickup image I in the RAW format, pixel values of red pixels R, green pixels G and blue pixels B are arrayed as a 2-by-2 Bayer structure. As an example, for a blue pixel B22, the RGB interpolation circuit 11 calculates an average green value, by calculating an average value of green pixels G12, G21, G23, G32 that are arranged so as to be adjacent to the blue pixel B22 in upward, leftward, rightward and downward directions. Further, the RGB interpolation circuit 11 calculates an average red value, by calculating an average value of read pixels R11, R13, R31, R33 that are arranged so as to be adjacent to the blue pixel B22 in diagonal directions. Subsequently, the RGB interpolation circuit 11 generates data in the RGB format for the blue pixel B22, by interpolating the average red value and the average green value. Note that the color interpolation process is not limited to the process but may be another process for converting the RAW format into the RGB format. The color interpolation process in the RGB interpolation circuit 11 may be a simpler process than the color interpolation process in the image signal generation circuit 4.

The selection circuit 21 is configured by a multiplexor circuit, for example. In the selection circuit 21, an input side is connected with the RGB interpolation circuit 11 and the digital amplifier 61, and an output side is connected with the functional circuit 31. When the pickup image I in the RAW format is input from the digital amplifier 61, the selection circuit 21 outputs the pickup image I input from the RGB interpolation circuit 11, to the functional circuit 31. On the other hand, when the pickup image I in the RGB format is input from the digital amplifier 61, the pickup image I input from the digital amplifier 61 is output to the functional circuit 31.

The functional circuit 31 is a circuit configured to calculate an average color-difference value U for blue and an average color-difference value V for red, which are average values of color-difference components, by a predetermined operation, based on the pickup image I input from the selection circuit 21. The functional circuit 31 is connected with the gain calculation circuit 41, and outputs the average color-difference value V for red and the average color-difference value U for blue, to the gain calculation circuit 41.

In the predetermined operation, the functional circuit 31 converts the pixels in a whole region G that is a region of the whole of the pickup image I, from the RGB format to a YUV format, by a predetermined YUV conversion process. Subsequently, the functional circuit 31 calculates the average color-difference value V for red, by summing up color-difference components for red contained in pixels in the YUV format and dividing the sum of the color-difference components for red by a pixel number of the whole region G. For example, FIG. 4 shows an example of a pickup image I including w×h pixels. In FIG. 4, the functional circuit 31 calculates the average color-difference value V for red, by dividing the sum of the color-difference components for red by w×h. The functional circuit 31 calculates the average color-difference value U for blue, by dividing a sum of color-difference components for blue by the pixel number of the whole region G.

The gain calculation circuit 41 is a circuit configured to calculate and output the first gain. The gain calculation circuit 41, which is connected with the storage circuit 51 and the digital amplifier 61, calculates the first gain based on the average color-difference value V for red and the average color-difference value U for blue in the whole region G input from the functional circuit 31, the average color-difference value V for red and the average color-difference value U for blue associated with each of the divided regions L, and the correction gain read from the storage circuit 51, and outputs the first gain to the digital amplifier 61.

That is, the gain calculation circuit 41 calculates the first gain based on the pickup image I fed back from the digital amplifier 61.

The first gain has a correction coefficient for the pixel with which the average color-difference value in the whole region G is brought close to a predetermined convergent point. The predetermined convergent point is previously set by a parameter, such that the white balance is adjusted more properly. For example, the predetermined convergent point is a point at which each of the color-difference components for blue and red is 0, but is not limited to the point.

The second gain is associated with each of the divided regions L, and has a correction coefficient for the pixel with which the average color-difference value in each of the divided regions L is brought close to the predetermined convergent point.

The division number of the divided regions L and the size of each of the divided regions L are adjusted empirically or experimentally, such that the white balance is adjusted more properly, and is previously set. In the example of FIG. 4, the pickup image I is divided into divided regions L11 to Lmn. All or some of the divided regions L11 to Lmn are hereinafter, referred to as the divided regions L.

The correction gain is associated with each of the pixels of the pickup image I, and is used for the correction of each of the pixels.

Each of the first gain, the second gain and the correction gain has a red gain for correcting the red color, a green gain for correcting the green color, and a blue gain for correcting the blue color.

In FIG. 5, a U-axis indicates the color-difference component for blue, and a V-axis indicates the color-difference component for red. The gain calculation circuit 41 calculates the first gain, such that the average color-difference value V for red and the average color-difference value U for blue are brought close to the predetermined convergent point.

For example, FIG. 5 shows a target pixel P at which the average color-difference value V for red is a negative value and the average color-difference value U for blue is a positive value. The gain calculation circuit 41 reads the correction gain from the storage circuit 51, and calculates the first gain by multiplying the blue gain included in the correction gain by a first predetermined coefficient lager than 0 and smaller than 1 and multiplying the red gain by a second predetermined coefficient larger than 1, such that the average color-difference value V for red and the average color-difference value U for blue at the target pixel P are brought close to the predetermined convergent point (an arrow in FIG. 5).

The first predetermined coefficient and the second predetermined coefficient are adjusted empirically or experimentally, such that the white balance is adjusted more properly, and is previously set.

That is, the gain calculation circuit 41 calculates the first gain with which the average color-difference value in the whole region G of the pickup image I is brought close to the predetermined convergent point.

When a value obtained by subtracting a predetermined convergent point setting value from the average color-difference value is a positive value, the gain calculation circuit 41 calculates the first gain by multiplying the correction gain by the first predetermined coefficient that is set so as to be larger than 0 and smaller than 1. When the value obtained by subtracting the predetermined convergent point setting value from the average color-difference value is a negative value, the gain calculation circuit 41 calculates the first gain by multiplying the correction gain by the second predetermined coefficient that is set so as to be larger than 1.

The storage circuit 51 is configured by a readable and writable memory. The storage circuit 51 is connected with the gain calculation circuit 41 and the digital amplifier 61.

The storage circuit 51 can store the second gain input from the digital amplifier 61 and associated with each of the divided regions L.

The storage circuit 51 can also store the correction gain input from the digital amplifier 61 and associated with each of the pixels.

The storage circuit 51 also stores a corrected pixel number to which correction with a weighting gain is performed, for each of the divided regions L.

Figure 6:
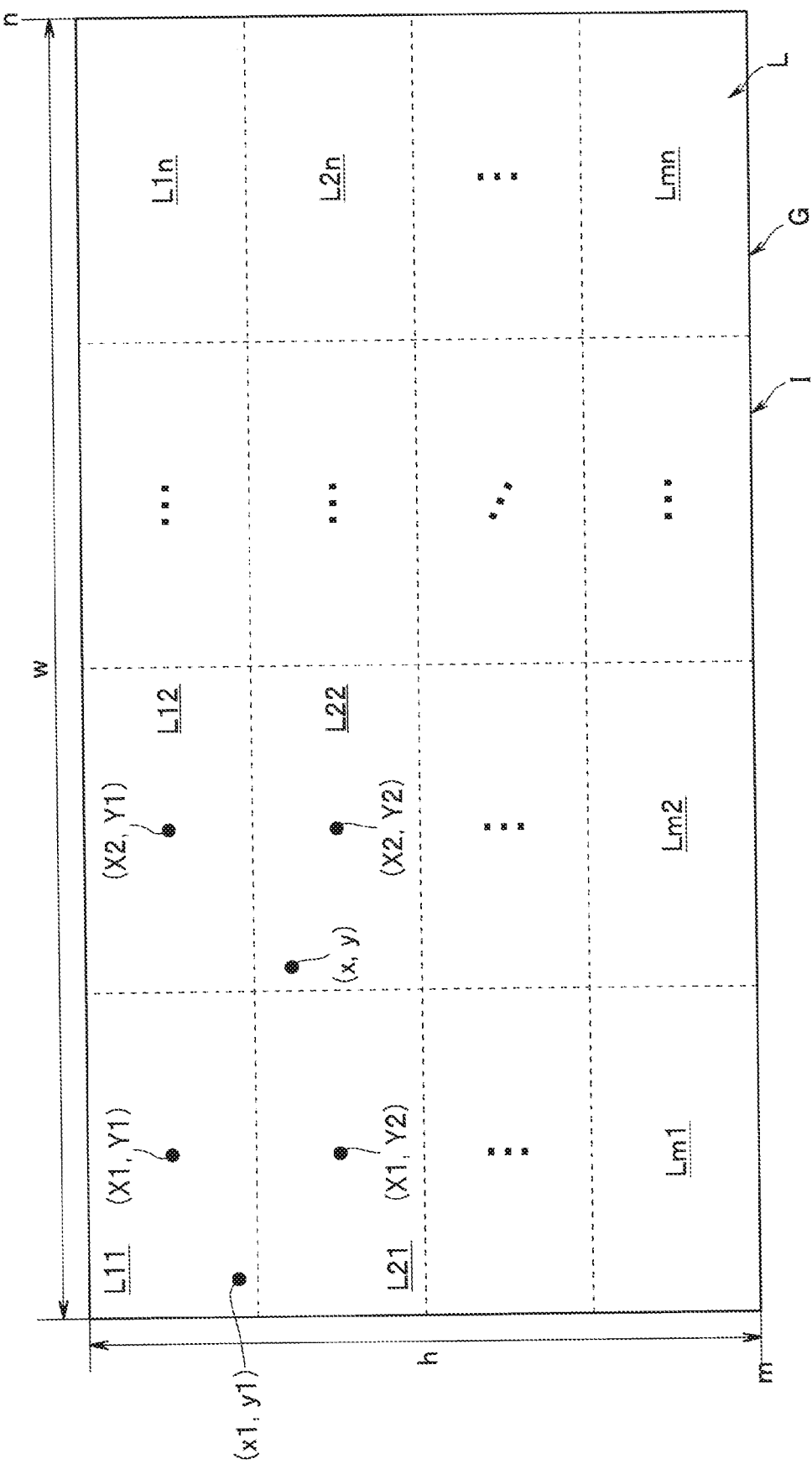
FIG. 6 is a diagram for describing an example of a calculation process for a weighting gain in the AWB circuit of the image signal processing apparatus according to the embodiment.

FIG. 6 is a diagram for describing an example of a calculation process for the weighting gain in the AWB circuit 3 of the image signal processing apparatus 1 according to the embodiment.

The digital amplifier 61 is connected with the input circuit 2 and the image signal generation circuit 4, and is a circuit configured to adjust the white balance of the pickup image I input from the input circuit 2, based on the first gain input from the gain calculation circuit 41, and to output the pickup image I to the image signal generation circuit 4.

More specifically, the digital amplifier 61 sets the value of the first gain as the second gain under a predetermined condition, for each of the divided regions L.

The predetermined condition is adjusted empirically or experimentally, such that the white balance is adjusted more properly, and is previously set.

For example, the predetermined condition is a condition that the corrected pixel number to which the correction with the weighting gain is performed is smaller than a predetermined threshold value in each of the divided regions L.

Note that the predetermined condition may be, for example, a condition that the number of the pixels corrected with the first gain is larger than the corrected pixel number to which the correction with the weighting gain is performed in each of the divided regions L.

For example, the predetermined condition may be a detection of a predetermined change of a light source. For example, the predetermined change of the light source is a change in mutual magnitude relation among the pixel values for the respective colors in a predetermined region of the pickup image I. More specifically, the predetermined change of the light source may be a change in magnitude relation among the average values of the pixels, for example, a change from a magnitude relation of red>green>blue to a magnitude relation of green>red>blue. When the predetermined change of the light source is detected, the digital amplifier 61 sets the first gain as the second gains for all divided regions L.

Subsequently, the digital amplifier 61 calculates the weighting gain. The weighting gain is calculated for each of the pixels in the pickup image I. The digital amplifier 61 determines a plurality of first center pixels that are positioned at respective centers of the divided regions L, by a predetermined center pixel determination process. From the plurality of first center pixels, the digital amplifier 61 detects a second center pixel adjacent to a calculation target pixel, by a predetermined detection process. The digital amplifier 61 performs the weighting of the second gain associated with the divided region L containing the second center pixel depending on a distance between the calculation target pixel and the second center pixel, and calculates the weighting gain for each of red, green and blue.

In the example of FIG. 6, the digital amplifier 61 determines second center pixels (X1, Y1), (X2, Y1), (X1, Y2), (X2, Y2) adjacent to a calculation target pixel (x, y). The second center pixel (X1, Y1) is contained in the divided region L11, the second center pixel (X2, Y1) is contained in the divided region L12, the second center pixel (X1, Y2) is contained in the divided region L21, and the second center pixel (X2, Y2) is contained in the divided region L22. Subsequently, the digital amplifier 61 performs the weighting of the second gain by an operation shown in equation (1), and calculates the weighting gain.

In equation (1), X is the weighting gain. Gain represents the value of the second gain associated with the divided region L. For example, GainL11 represents the value of the second gain associated with the divided region L11. Further, xR represents an x-coordinate of the second center pixel on a rightward side of the calculation target pixel, xL represents an x-coordinate of the second center pixel on a leftward side of the calculation target pixel, yD represents a y-coordinate of the second center pixel on a downward side of the calculation target pixel, and yU represents a y-coordinate of the second center pixel on an upward side of the calculation target pixel.

$$X = (GainL11*(xR-x)*(yD-y)) + \quad (1)$$
$$GainL12*(x-xL)*(yD-y) + GainL21*(xR-x)*(y-yU) +$$
$$GainL22*(x-xL)*(y-yU)/((xR-Xl)*(yD-yU)) =$$
$$(GainL11*(X2-x)*(Y2-y) + GainL12*(x-X1)*(Y2-y) +$$

-continued $$GainL21*(X2-x)*(y-Y1)+$$
$$GainL22*(x-X1)*(y-Y1)/((X2-X1)*(Y2-Y1))$$

When the calculation target pixel (x1, y1) is at a peripheral portion of the pickup image I such as a leftward side of X1, a rightward side of Xn, an upward side of Y1 or a downward side of Ym, a mirroring of the divided region L positioned at the peripheral portion may be performed, and the second center pixel adjacent to the calculation target pixel may be virtually provided. For example, in the example of FIG. 6, with respect to the calculation target pixel (x1, y1) that is on the leftward side of X1 and is between Y1 and Y2, the mirroring of the divided regions L11, L21 may be performed such that a left-side edge is a mirror center, and a virtual divided region L may be provided on a leftward side of the calculation target pixel (x1, y1).

Subsequently, the digital amplifier 61 calculates a first candidate pixel C1 based on the first gain, by multiplying the calculation target pixel by the first gain (FIG. 5). The digital amplifier 61 also calculates a second candidate pixel C2, by multiplying the calculation target pixel by the weighting gain. The digital amplifier 61 calculates a YUV pixel value (gY, gU, gV) based on the first gain and a YUV pixel value (1Y, 1U, 1V) based on a weighting gain, by performing a predetermined YUV conversion process to the first candidate pixel C1 and the second candidate pixel C2. The digital amplifier 61 normalizes the YUV pixel value with respect to a luminance component, and calculates a color-difference component (gU/gY, gV/gY) based on the first gain and a color-difference component (1U/1Y, 1V/1Y) based on the weighting gain.

From the color-difference components (gU/gY, gV/gY), (1U/1Y, 1V/1Y), the digital amplifier 61 judges which of the color-difference components of the first candidate pixel C1 and the second candidate pixel C2 is closer to the predetermined convergent point. When the color-difference component of the first candidate pixel C1 is closer to the predetermined convergent point than the color-difference component of the second candidate pixel C2 is, the digital amplifier 61 determines that the correction gain to be used for the correction is the first gain. On the other hand, when the color-difference component of the second candidate pixel C2 is closer to the predetermined convergent point than the color-difference component of the first candidate pixel C1 is, the digital amplifier 61 determines that the correction gain is the weighting gain.

For example, in FIG. 5, the first candidate pixel C1 (gU/gY, gV/gY) is closer to the predetermined convergent point than the second candidate pixel C2 (1U/1Y, 1V/1Y) is, and the digital amplifier 61 determines that the correction gain is the first gain.

The digital amplifier 61 corrects the pickup image I input from the input circuit 2, with the correction gain, and outputs the pickup image I to the image signal generation circuit 4. The digital amplifier 61 outputs the correction gain to the storage circuit 51, and makes the storage circuit 51 store the correction gain.

That is, the digital amplifier 61 calculates the second candidate pixel C2 by performing the weighting of the second gain depending on the position of the pixel.

The digital amplifier 61 determines the second center pixel adjacent to the pixel, from the first center pixels positioned at the respective centers of the divided regions L, and calculates the second candidate pixel C2 by performing the weighting of the second gain depending on the distance between the pixel and the second center pixel.

When the corrected pixel number read from the storage circuit 51 is smaller than the predetermined threshold, the digital amplifier 61 sets the first gain as the second gain associated with the divided region L, and calculates the second candidate pixel C2.

The digital amplifier 61 corrects the white balance of the pixel of the pickup image I, with a candidate pixel that is of the first candidate pixel C1 calculated based on the first gain and the second candidate pixel C2 calculated based on the second gain and in which the color-difference component is closer to the predetermined convergent point, and sets the first gain as the second gain, in the divided region L in which the corrected pixel number to which the correction with the second candidate pixel C2 is performed is smaller than the predetermined threshold value.

(Operation)

Next, the operation of the image signal processing apparatus 1 according to the embodiment will be described.

Figure 7:
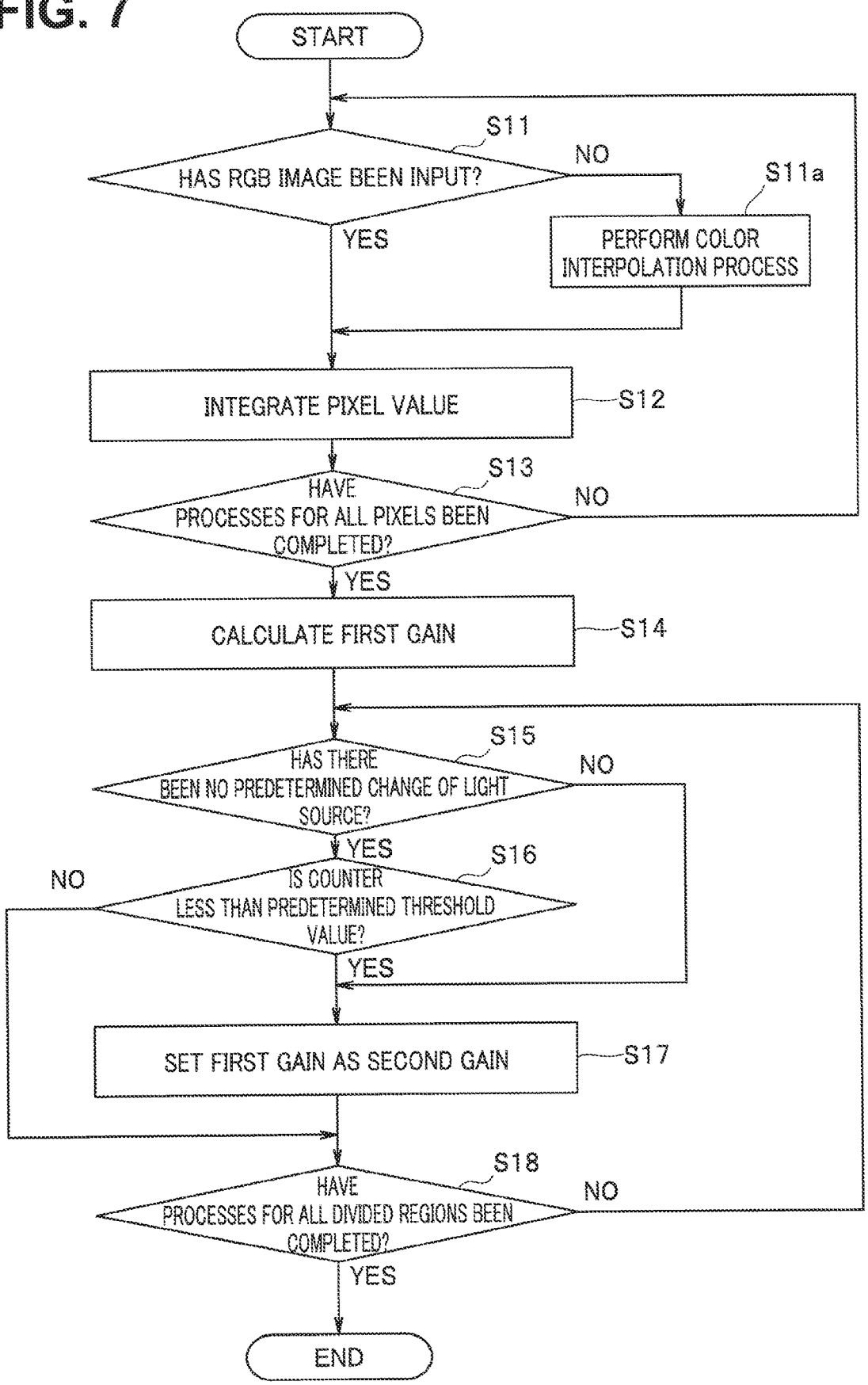
FIG. 7 is a flowchart showing an example of the calculation process for the first gain and the second gain in the AWB circuit of the image signal processing apparatus according to the embodiment.

FIG. 7 is a flowchart showing an example of the calculation process for the first gain and the second gain in the AWB circuit 3 of the image signal processing apparatus 1 according to the embodiment.

Processes of S11 to S12 are executed for each of the pixels of the pickup image I.

When the pickup image I in the RGB format has not been input (S11: NO), the RGB interpolation circuit 11 performs the color interpolation process (S11a). The selection circuit 21 outputs the pickup image I after the color interpolation process, to the functional circuit 31. On the other hand, when the pickup image I in the RGB format has been input (S11: YES), the selection circuit 21 outputs the pixel value fed back from the digital amplifier 61, to the functional circuit 31.

The functional circuit 31 integrates the pixel value (S12). The functional circuit 31 converts the pickup image I from the RGB format to the YUV format by the predetermined YUV conversion process. The functional circuit 31 integrates the pixel value such that the sum in the whole region G can be output. The functional circuit 31 judges whether the processes for all pixels have been completed (S13). When the integration of all pixels has not been completed, the process returns to S11 (S13: NO). On the other hand, when the integration of all pixels has been completed (S13: YES), the process proceeds to S14.

The functional circuit 31 calculates the first gain (S14). The functional circuit 31 calculates the average color-difference value V for red and the average color-difference value U for blue in the whole region G. The functional circuit 31 reads the correction gain from the storage circuit 51, and calculates the first gain based on the correction gain, the average color-difference value V for red and the average color component for blue.

Processes of S15 to S17 are executed for each of the divided regions L.

The digital amplifier 61 judges whether the predetermined change of the light source has not been detected (S15). When the predetermined change of the light source has not been detected (S15: YES), the process proceeds to S16. On the other hand, when the predetermined change of the light source has been detected (S15: NO), the process proceeds to S17.

The digital amplifier 61 judges whether a counter is less than a predetermined threshold (S16). When the counter indicating the number of pixels corrected with the weighting gain is less than the predetermined threshold value (S16: YES), the process proceeds to S17. On the other hand, when the counter is equal to or more than the predetermined threshold value (S16: NO), the process proceeds to S18.

The digital amplifier 61 sets the first gain as the second gain (S17).

The digital amplifier 61 judges whether the processes for all divided regions L have been completed (S18). When the processes for all divided regions L have not been completed (S18: NO), the process returns to S15. When the processes for all divided regions L have been completed (S18: YES), the process ends.

Next, the correction process in the AWB circuit 3 will be described.

Figure 8:
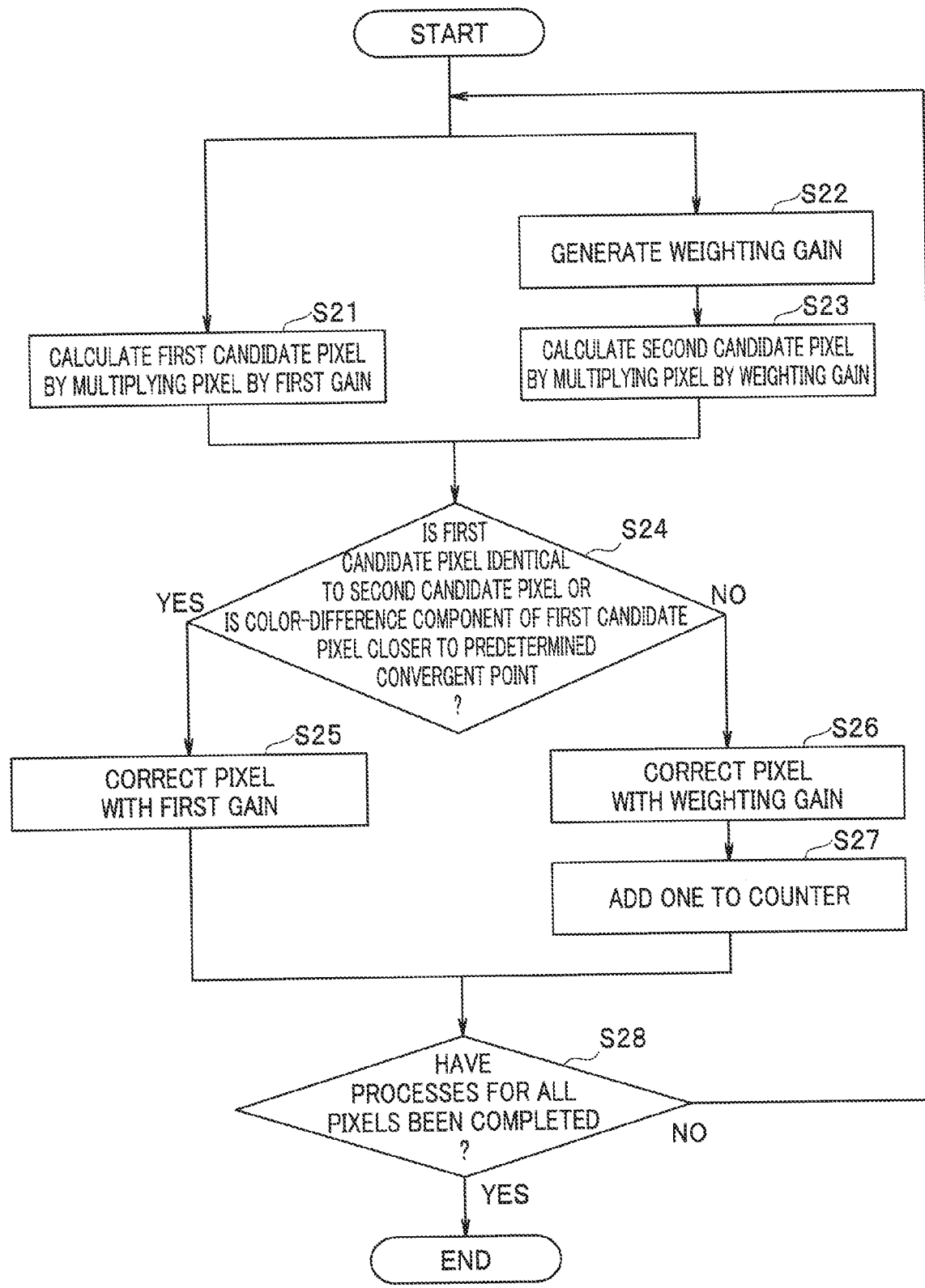
FIG. 8 is a flowchart showing an example of a correction process in the AWB circuit of the image signal processing apparatus according to the embodiment.

FIG. 8 is a flowchart showing an example of the correction process in the AWB circuit 3 of the image signal processing apparatus 1 according to the embodiment.

Processes of S21 to S28 are executed for each of the pixels of the pickup image I.

The digital amplifier 61 calculates the first candidate pixel C1 by multiplying the pixel by first gain (S21). After the S21, the process proceeds to S24.

The digital amplifier 61 calculates the weighting gain based on the second gain (S22).

The digital amplifier 61 calculates the second candidate pixel C2 by multiplying the pixel by the weighting gain (S23). In the example of FIG. 8, S21, S22 and S23 are executed in parallel, but may be executed in series.

The digital amplifier 61 judges whether the first candidate pixel C1 is identical to the second candidate pixel C2, or whether the color-difference component of the first candidate pixel C1 is closer to the predetermined convergent point (S24). The digital amplifier 61 converts each of the first candidate pixel C1 and the second candidate pixel C2 into YUV, and compares the color-difference components to each other. When the color-difference component of the first candidate pixel C1 is closer to the predetermined convergent point than the color-difference component of the second candidate pixel C2 is (S24: YES), the process proceeds to S25. On the other hand, when the color-difference component of the second candidate pixel C2 is closer to the predetermined convergent point than the color-difference component of the first candidate pixel C1 is (S24: NO), the process proceeds to S26.

The digital amplifier 61 corrects the pixel with the first gain (S25). The digital amplifier 61 determines that the correction gain is the first gain. The digital amplifier 61 corrects the pixel of the pickup image I input from the input circuit 2, with the correction gain. After S25, the process proceeds to S28.

The digital amplifier 61 corrects the pickup image I with the weighting gain (S26). The digital amplifier 61 determines that the correction gain is the weighting gain. The digital amplifier 61 corrects the pickup image I input from the input circuit 2, with the correction gain. The digital amplifier 61 adds one to the counter associated with the divided region L (S27).

It is judged whether the processes for all pixels have been completed (S28). When the processes for all pixels have not been completed (S28: NO), the process returns to S21 and S22. On the other hand, when the processes for all pixels have been completed (S28: YES), the process ends.

Thereby, immediately after activation starts, since the correction of the pixel with the weighting gain has not been performed, the digital amplifier 61, after the processes of S11 to S14, judges that there has been no change of the light source (S15: YES). The digital amplifier 61 judges that the counter is less than the predetermined threshold value (S16: YES), and sets the first gain as the second gain, in all divided regions L (S17). Therefore, the value of the first gain is the same as the value of the second gain. The result by the first gain is the same as the result by the weighting gain calculated by the weighting of the second gain. The color-difference component of the first candidate pixel calculated in S21 is the same as the color-difference component of the second candidate pixel calculated in S22 and S23. The AWB circuit 3 corrects the pixel with the first gain (S24: YES. S25).

With the repetition of the feedback, the AWB circuit 3 determines that the correction gain is a candidate pixel that is of the first candidate pixel (S21) multiplied by the first gain and the second candidate pixel (S22, S23) multiplied by the weighting gain and in which the color-difference component is closer to the predetermined convergent point, and corrects the pickup image I (S24: NO). Accordingly, when the white balance with the first gain is lost at a partial region such as a region on an object under a plurality of light sources, the AWB circuit 3 can adjust the white balance of the partial region with the weighting gain more properly.

The AWB circuit 3 counts the number of pixels corrected with the weighting gain (S27). For the divided region L for which it is judged that the counter is equal to or more than the predetermined threshold, the second gain is not replaced by the first gain, until the change of the light source is detected (S16: NO).

When the AWB circuit 3 detects the change of the light source (S15), the first gain is set as the second gain associated with each of the divided regions L. Accordingly, at the time immediately after the detection of the change of the light source, the AWB circuit 3 corrects the pickup image I with the first gain, similarly to the time immediately after the start of the activation described above. With the repetition of the feedback, the AWB circuit 3 advances the adjustment of the white balance.

According to the embodiment, even when a plurality of light sources exist, the image signal processing apparatus 1 can adjust the white balance of the pickup image I more properly, and can enhance the image quality.

Note that although the functional circuit 31 converts the pickup image I in the RGB format fed back from the digital amplifier 61 into the YUV format and calculates the average color-difference value V for red and the average color-difference value U for blue in the embodiment, the functional circuit 31 may be configured to generate the average color-difference value V for red and the average color-difference value U for blue by directly inputting a YUV pixel value that is of the YUV pixel value (gY, gU, gV) and the YUV pixel value (1Y, 1U, 1V) generated in the digital amplifier 61 and that is closer to an achromatic color.

Note that the first gain may be calculated based on each of the pixels whose color-difference component is in a predetermined range. For example, the functional circuit 31 may remove pixels in each of which absolute values of the U-component and the V-component exceed predetermined ranges, and may calculate the average color-difference value in the whole region G. More specifically, after the functional circuit 31 converts the pixels in the whole region G from the RGB format to the YUV format, the functional circuit 31 removes the pixels in each of which the absolute values of the U-component and the V-component exceed the predetermined ranges, and calculates the average color-difference value V for red and the average color-difference value U for blue. Subsequently, the gain calculation circuit 41 calculates the first gain based on the average color-difference value V for red and the average color-difference value U for blue calculated by the functional circuit 31. Thereby, the AWB circuit 3 can remove an object having a high chroma, from gain calculation targets. Further, the AWB circuit 3 can remove predetermined regions such as a vicinity of a frame edge and the sky in an on-board image, from gain calculation targets.

Note that although an example in which the input/output format of the AWB circuit 3 is the RGB format or the RAW format has been described in the embodiment, image data having another format may be adopted without being limited to the formats.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. An image processing circuit comprising:
    a gain calculation circuit configured to calculate a first gain with which an average color-difference value in a whole region of a pickup image is brought close to a predetermined convergent point; and
    a digital amplifier configured to perform correction of a white balance of a pixel of the pickup image with one of a first candidate pixel and a second candidate pixel, the first candidate pixel being calculated based on the first gain, the second candidate pixel being calculated based on a second gain associated with each of a plurality of divided regions into which the pickup image is divided, the one of the first candidate pixel and the second candidate pixel being a candidate pixel in which a color-difference component is closer to the predetermined convergent point, the digital amplifier being configured to set the first gain as the second gain in the divided regions in each of which a corrected pixel number is smaller than a predetermined threshold value, the corrected pixel number being a number to which the correction with the second candidate pixel is performed.

2. The image processing circuit according to claim 1, wherein
    the digital amplifier calculates the second candidate pixel by performing weighting of the second gain depending on a position of the pixel.

3. The image processing circuit according to claim 1, wherein
    the digital amplifier determines a second center pixel adjacent to the pixel, from first center pixels positioned at respective centers of the divided regions, and calculates the second candidate pixel by performing weighting of the second gain depending on a distance between the pixel and the second center pixel.

4. The image processing circuit according to claim 1, wherein
    when the digital amplifier detects a predetermined change of a light source, the digital amplifier sets the first gain as the second gain for a corresponding divided region of the divided regions.

5. The image processing circuit according to claim 1, comprising a storage circuit, wherein the storage circuit stores the corrected pixel number associated with each of the divided regions, and
    when the corrected pixel number read from the storage circuit is smaller than the predetermined threshold, the digital amplifier sets the first gain as the second gain associated with a corresponding divided region of the divided regions, and calculates the second candidate pixel.

6. The image processing circuit according to claim 1, wherein
    the gain calculation circuit calculates the first gain based on the pickup image fed back from the digital amplifier.

7. The image processing circuit according to claim 1, wherein
    when a value obtained by subtracting a predetermined convergent point setting value from the average color-difference value is a positive value, the gain calculation circuit calculates the first gain by multiplying a correction gain by a first predetermined coefficient that is set so as to be larger than 0 and smaller than 1, and
    when the value obtained by subtracting the predetermined convergent point setting value from the average color-difference value is a negative value, the gain calculation circuit calculates the first gain by multiplying the correction gain by a second predetermined coefficient that is set so as to be larger than 1.

8. The image processing circuit according to claim 1, wherein
    the predetermined convergent point is a point at which each of color-difference components for blue and red is 0.

9. The image processing circuit according to claim 1, comprising a functional circuit, wherein
    the functional circuit removes a pixel at which absolute values of a U-component and a V-component exceed predetermined ranges, and calculates the average color-difference value in the whole region.

10. An image signal processing apparatus comprising:
    an input circuit configured to receive a pickup image;
    an image processing circuit configured to adjust a white balance of the pickup image, the image processing circuit including
    a gain calculation circuit configured to calculate a first gain with which an average color-difference value in a whole region of the pickup image is brought close to a predetermined convergent point, and
    a digital amplifier configured to perform correction of a white balance of a pixel of the pickup image with one of a first candidate pixel and a second candidate pixel, the first candidate pixel being calculated based on the first gain, the second candidate pixel being calculated based on a second gain associated with each of a plurality of divided regions into which the pickup image is divided, the one of the first candidate pixel and the second candidate pixel being a candidate pixel in which a color-difference component is closer to the predetermined convergent point, the digital amplifier being configured to set the first gain as the second gain in the divided regions in each of which a corrected pixel number is smaller than a predetermined threshold value, the corrected pixel number being a number to which the correction with the second candidate pixel is performed;
    an image signal generation circuit configured to perform a color interpolation process and a color matrix process to the pickup image in which the white balance is adjusted by the image processing circuit;

an image quality adjustment circuit configured to adjust a luminance and a contrast of the pickup image input from the image signal generation circuit; and an output circuit configured to output an output image in which the luminance and the contrast are adjusted.

11. An image processing method comprising:

calculating a first gain with which an average color-difference value in a whole region of a pickup image is brought close to a predetermined convergent point;

calculating a first candidate pixel based on the first gain;

calculating a second candidate pixel based on a second gain associated with each of a plurality of divided regions into which the pickup image is divided;

performing correction of a white balance of a pixel of the pickup image with one of the first candidate pixel and the second candidate pixel, the one of the first candidate pixel and the second candidate pixel being a candidate pixel in which a color-difference component is closer to the predetermined convergent point; and setting the first gain as the second gain in the divided regions in each of which a corrected pixel number is smaller than a predetermined threshold value, the corrected pixel number being a number to which the correction with the second candidate pixel is performed.

* * * * *